United States Patent [19]

Lüpertz et al.

[11] 4,289,359
[45] Sep. 15, 1981

[54] BRAKE FORCE REGULATOR FOR A MOTORCYCLE HYDRAULIC BRAKE SYSTEM

[75] Inventors: Hans-Henning Lüpertz, Darmstadt; Volker Berisch, Hattersheim, both of Fed. Rep. of Germany

[73] Assignee: ITT Industries, Inc., New York, N.Y.

[21] Appl. No.: 77,426

[22] Filed: Sep. 20, 1979

[30] Foreign Application Priority Data

Nov. 2, 1978 [DE] Fed. Rep. of Germany ....... 2847571

[51] Int. Cl.³ ............................................... B60T 8/26
[52] U.S. Cl. ..................................... 303/6 C; 188/344
[58] Field of Search ............... 188/344, 349; 303/6 C, 303/6 R, 13

[56] References Cited

FOREIGN PATENT DOCUMENTS 2743204  4/1979  Fed. Rep. of Germany ...... 303/6 C

*Primary Examiner*—Duane A. Reger
*Attorney, Agent, or Firm*—John T. O'Halloran; Alfred C. Hill

[57] ABSTRACT

In a known motorcycle brake system, the pedal master cylinder acts on the front-and rear-wheel brakes, and the hand master cylinder acts only on the front-wheel brake. The brake force regulator's control behavior is influenced by the hand master cylinder. This known arrangement has functional disadvantages, since the rear-wheel brake is evacuated of fluid if the hand master cylinder alone is actuated. In addition, the regulator's change-over point is reached at a relatively high pressure. These disadvantages are eliminated by the regulator of the present invention by the provision of a valve adapted to closed independently of the position of the regulator's stepped piston. The stepped piston is not moved when the hand master cylinder alone is actuated. Also, the regulator of the present invention provides an improved deceleration of the motorcycle.

15 Claims, 2 Drawing Figures

4,289,359

BRAKE FORCE REGULATOR FOR A MOTORCYCLE HYDRAULIC BRAKE SYSTEM

BACKGROUND OF THE INVENTION

This invention relates to a brake force regulator for a motorcycle hydraulic brake system, comprising a control piston, which is slidable in response to the pressure of a hand master cylinder and adapted to reduce the brake pressure of a rear-wheel brake by arranging for the control piston to be moved into a fluid inlet chamber connected with the pedal master cylinder, such movement being caused by the pressure of the hand master cylinder under increase in volume of a fluid outlet chamber connected with the rear-wheel brake, the control piston having a fluid passageway connecting the fluid inlet chamber with the fluid outlet chamber with a closure member arranged therein, the control piston being urged into abutment with a stop on the side close to the fluid inlet chamber by a return spring and having an effective area on the side close to the fluid inlet chamber, which area is subjected to pressure against the force of the return spring to cause displacement of the control piston in the direction of the fluid outlet chamber, with the closure member having an associated piston which is movable in the closing direction of the closure member against the force of a spring extending into a hollow space connected to atmosphere.

From German Patent DE-OS No. 2,558,825 a brake system is known which is provided with a first brake-applying device connected with a front-wheel brake and a second brake-applying device connected with a rear-wheel brake. In this arrangement, the first brake-applying device is adapted to reduce a brake force deliverable to the rear-wheel brake through the second brake-applying device.

This known brake system comprises a brake force regulator which resembles conventional brake force regulators for passenger cars. Actuation of the pedal master cylinder initially results in unreduced pressure supply to a front-wheel brake and reduced pressure supply to the rear-wheel brake. If in addition the hand master cylinder is actuated, the pressure thereby generated counteracts the control force of the brake force regulator so that it reduces the pressure of the rear-wheel brake to a greater extent than if only the pedal master cylinder is actuated. In this arrangement, the brake force regulator is so designed that the displacement travel of its stepped piston is sufficient to reduce the pressure in the pressure of a front-wheel brake.

This prior known brake force regulator has the functional disadvantage that its stepped piston can be displaced also when pressure is built up by the hand master cylinder, i.e., when only the hand brake, which acts on the front wheel, is applied. This displacement of the stepped piston causes pressurized fluid to be drawn from the rear-wheel brake. As a result, a vacuum will be produced in the rear-wheel brake which may draw in air and containments that might result in a failure of the brakes. At all events, the drawing in of pressurized fluid from the rear-wheel brake will increase the brake clearance. This disadvantage is eliminated by the subject matter of the copending U.S. application of K. Engert, Ser. No. 027,980, filed Apr. 9, 1979, having the same assignee as the present application.

SUMMARY OF THE INVENTION

It is an object of the present invention to improve upon the brake force constructed according to the principles of the above-cited copending application in such a manner as to improve the motorcycle's deceleration.

A feature of the present application is the provision of a brake force regulator for a motorcycle brake system comprising;

a control piston disposed coaxially within a housing, the control piston being slidable in response to pressure from a hand master cylinder and adapted to reduce brake pressure to a rear-wheel brake upon movement of the control piston into a fluid input chamber disposed in the housing and connected to a pedal master cylinder, the movement being caused by the pressure of the hand master cylinder which increases the volume of a fluid outlet chamber disposed in the housing connected to the rear-wheel brake;

a fluid passageway disposed in the control piston connecting the inlet chamber to the outlet chamber;

a second piston having a closure member for the passageway disposed within the control piston, the second piston being movable in a closing direction of the passageway against the force of a first spring extending into a hollow space in the housing connected to atmosphere;

a return spring abutting one end of the control piston to urge the control piston into abutment with a stop in the housing adjacent the inlet chamber, the control piston having an effective area adjacent the inlet chamber subjected to pressure against the force of the return spring to cause displacement of the control piston in the direction of the outlet chamber;

means disposed within the housing adjacent the control piston which upon attainment of a predetermined differential of pressure between the pressure prevailing in the inlet and outlet chambers, opens the passageway after it has been closed during a braking operation; and sealed areas of the control piston have their cross-sections dimensioned independently of each other.

The essential advantage of the brake force regulator of the present invention over the above-cited copending application is that for the individual steps of the braking action, a brake-pressure distribution between the front- —and rear-wheel brakes is provided which leads to an improved deceleration of the motor—cycle. The demands this arrangement makes on the vehicle operator are not greater than in brake systems hitherto known, on the contrary, it makes driving easier for him because in the majority of cases he needs only apply the pedal brake. These advantages are achieved by an overbraking of the rear wheel occurring initially on actuation of the pedal master cylinder, later followed by an adaptation of the front-wheel brake pressure to the rear-wheel brake pressure whereby the deceleration of the motorcycle approximates the ideal characteristic.

In a preferred embodiment of the subject matter of this invention, the means is a cross member secured to the housing and limiting the travel of displacement of the piston relative to the housing. By this arrangement, in the event of displacement of the control piston beyond a predetermined amount, the valve-closure member is lifted off its valve seat so that the pressure compensation is allowed to take place. In an advantageous improvement of the brake force regulator, the control piston comprises two parts, with the hollow space into which the piston is movable being formed between the piston parts. This arrangement permits, in a simple manner, the piston diameters to be chosen completely independently of each other, and in addition avoids piston offset.

In order to ensure that the pressure at the rear-wheel is initially intensified, it will be an advantage if one part of the control piston is a stepped piston which, with the end surface of its larger piston step, forms a boundary for the fluid inlet chamber, and with an annular surface of its larger piston step forms a boundary for the fluid outlet chamber. One piston part is preferably a pressure piston which is subjected to the pressure of the hand master cylinder and to the force of the return spring in the direction towards the other piston part. By this arrangement, the two piston parts permanently act reciprocally. In order to facilitate shifting back of the stepped position by menas of the hand master cylinder, it will be an advantage to guide the smaller step of the stepped piston in a sleeve secured to the housing and to arrange for the diameter of the pressure piston to be greater than the diameter of the smaller piston step. In a particularly simple arrangement, the cross member is engaged between a step on the housing and the sleeve and extends through an opening of the stepped piston.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
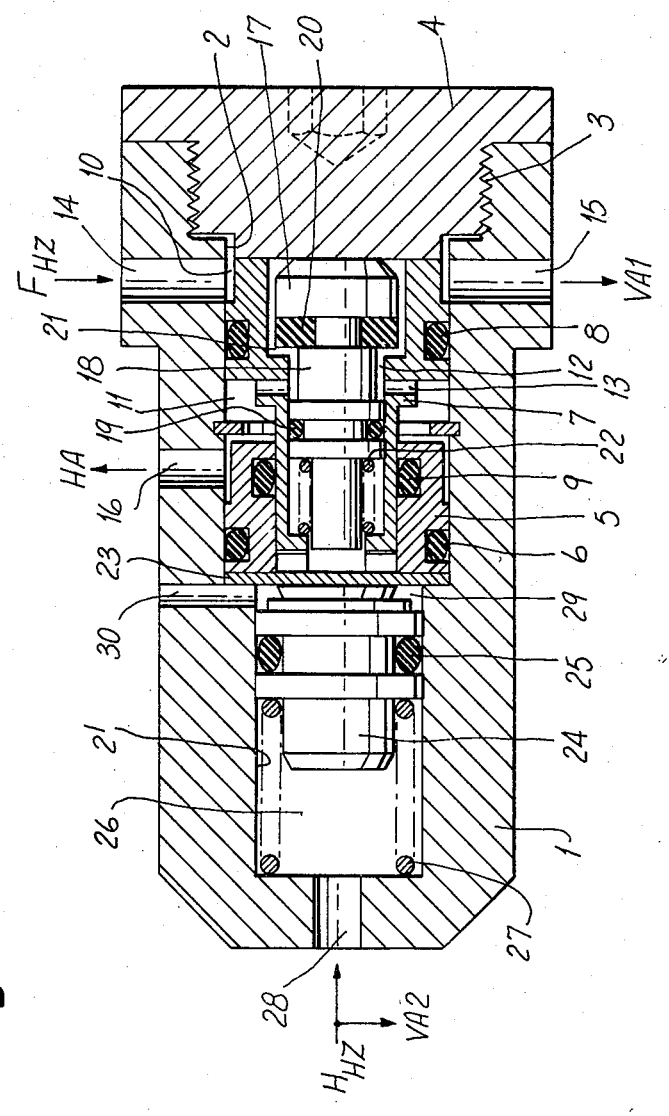
FIG. 1 is a longitudinal cross section of a brake force regulator in accordance with principles of the present invention.

In FIG.1, a housing 1 comprises a stepped blindend bore 2, 2' including at its open end a thread 3 and closed by means of a screw 4. Arranged in bore section 2 adjacent to bore section 2' is a sleeve 5 which is sealed relative to housing 1 by means of a seal 6. A stepped piston 7 providing one part of a control piston has its larger diameter portion disposed in bore section 2 between sleeve 5 and screw 4 whose adjacent surface provides a stop for piston 7, and its smaller diameter portion disposed in sleeve 5. Stepped piston 7 is sealed relative to housing 1 by means of a seal 8 and relative to sleeve 5 by means of a seal 9.

With the end surface of its larger diameter portion, stepped piston 7 forms a boundary for a fluid inlet chamber 10, and with an annular surface at the step between the two diameter portions it forms a boundary for a fluid outlet chamber 11. An axial fluid passageway 12, a radial bore 13 and the unsealed area between the inner surface of the screw 4 and the adjacent end surface of the larger diameter portion of step piston 7 connect the chambers 10 and 11. Provided in housing 1 are two fluid ports 14 and 15 opening into fluid inlet chamber 10, and a fluid port 16 opening into fluid outlet chamber 11, with fluid port 14 being connected to a pedal master cylinder $F_{HZ}$, fluid port 15 to a brake caliper of the front-wheel brake VA1, and fluid port 16 to a brake caliper of the rear-wheel brake HA.

Guided in axial fluid passageway 12 of stepped piston 7 is a piston 18 which is provided with a valve-closure member 17. Piston 18 being sealed relative to stepped piston 7 by means of a seal 19. Valve-closure member 17 has a ring seal 20 with a radial sealing area lying opposite a radial area of stepped piston 7 which latter area serves as a valve seat 21. A spring 22 preloads piston 18 in the valve-opening direction at a low force, with the valve-closure member 17 being in abutment with screw 4.

Engaged between sleeve 5 and the step between bore sections 2 and 2' is a rectangular-like cross member 23 which extends through the slotted end of the smaller diameter portion of stepped piston 7. Stepped piston 7 bears against the end surface of a pressure piston 24 which provides the other part of the control piston. Pressure piston 24 is sealed relative to housing 1 by means of a seal 25 and forms with its other end surface a boundary for a pressure chamber 26. Pressure chamber 26 accommodates a return spring 27 loading pressure piston 24 in the direction of stepped piston 7. Pressure chamber 26 has a fluid port 28 which is connected to a hand master cylinder $H_{HZ}$. Formed between pressure piston 24 and sleeve 5 is a hollow space 29 which connects with atmosphere through an opening 30 in housing 1. Hollow space 29 is in communication with the adjacent end of piston 18 past cross member 23 and the slotted end of the smaller diameter portion of step piston 7.

Figure 2:
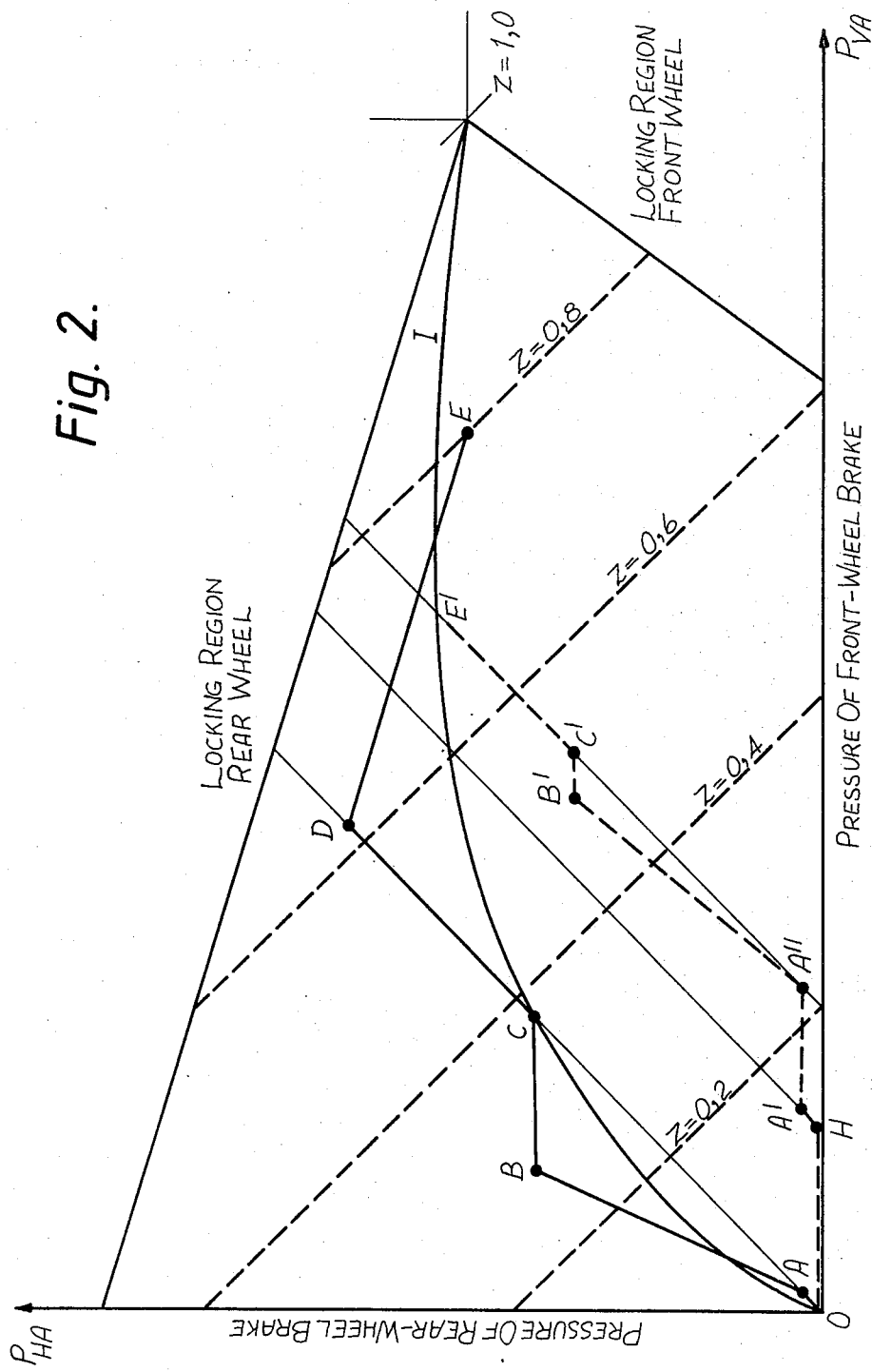
FIG. 2 is a chart showing brake pressure distribution curves useful in explaining the operation of the brake force regulator of the present invention.

FIG. 2 shows a chart with brake pressure distribution curves with the brake pressure of the rear-wheel brake being plotted against the brake pressure of the front-wheel brake. Curve I refects the ideal brake pressure distribution under a specific load condition of a motorcycle. "z" indicates the deceleration for each curve. The course of the brake pressure distribution curves (points O,A,B,C,D,E and O,H,A',A'',B',C',E; respectively) will be explained in connection with the description of the operation of the brake force regulator of the present invention. The mode of operation of the brake foece regulator illustrated in FIG. 1 depends on the sequence of actuation of the master cylinders and at which moment of the braking action the respective master cylinder is actuated. These variation possibilities result in a wide spectrum of brake pressure distribution characteristics of which only two examples will be described. The brake pressure distribution curves correspond in principle to the brake force regulator illustrated in FIG. 1, they are, however, not accurate with respect to the surface ratios indicated. This is not necessary because the area ratios can be chosen freely.

First, the situation will be described where initially the pedal master cylinder alone is actuated, later followed by actuation of the hand master cylinder.

At the beginning of the braking action, the brake force regulator is in the inactivated position shown in FIG. 1. On actuation of pedal master cylinder $F_{HZ}$, a pressure is developed in fluid inlet chamber 10 and acts on area 7' moving step piston 7 to the left in the drawing causing piston 7 to be spaced from the stop provided by the adjacent surface of screw 4. The pressure fluid in chamber 10 propagates to front-wheel brake VA1, on the one hand, and through the open fluid passageway 12 into fluid outlet chamber 11 and onwards to rear-wheel brake HA, on the other hand. Because of the different areas subjected to pressure, namely, the area $d_1$ and the area $(d_1-d_2)$, a differential of force will act on valve-closure member 17 moving piston 18 against spring 22. Ring seal 20 thereby moves into seating engagement with valve seat 21, thus closing fluid passageway 12.

Since the resilience of spring 22 is low, the valve closes at a low pressure. This is at point A of FIG. 2.

With the pressure in fluid inlet chamber 10 increasing by continued actuation of pedal master cylinder $F_{Hz}$, stepped piston 7 and pressure piston 24, the two parts of the control piston, are displaced against return spring 27. Piston 18 follows this movement due to the pressure in chamber 10 keeping passageway 12 closed. This results in the generation of a pressure in fluid outlet chamber 11 which is increased as compared to the pressure prevailing in fluid inlet chember 10, i.e., the brake pressure then prevailing in rear-wheel brake HA is higher than in front-wheel brake VA1. The pressure increase in rear-wheel brake HA is continued until piston 18 abuts cross member 23 which prevents it from being displaced further. This is at point B of FIG. 2.

As a result of piston 18 bearing against cross member 23, the effective area of stepped piston 7 subjected to the pressure in fluid inlet chamber 10 is reduced from area $d_3$ to area $(d_3-d_1)$. The pressure in fluid inlet chamber 10 is increased until the forces acting on stepped piston 7 are equal. Then valve-closure member 17 is lifted off valve seat 21 and a pressure compensation occurs provided that the pressures prevailing in chambers 10 and 11 are different, i.e., both brakes HA and VA1 are subjected to equal brake pressures. This point is identified by C in FIG. 2.

With continuing actuation of pedal master cylinder $F_{HZ}$, the pressures in front-wheel brake VA1 and in rearwheel brake HA increase evenly. As a result of the dynamic axle-load shift during the braking action, the rear wheel is relieved of the load as a consequence of which it tends to lock. In order to avoid a locked condition of the rear wheel, hand master cylinder $H_{Hz}$ is actuated additionally. The commencement of hand master cylinder actuation is identified by point D in FIG. 2.

Hand master cylinder $H_{Hz}$ causes a pressure to be developed in pressure chamber 27 which acts on pressure piston 24 and displaces it in the direction of stepped piston 7. Since stepped piston 7 is in interaction with pressure piston 24, it will be shifted in the same manner. Then there occurs only an increase in the brake pressure in front-wheel brake VA2 actuated by hand master cylinder $H_{Hz}$. This requires, however, that pedal master cylinder $F_{Hz}$ is not actuated further but only held in position. This pressure increase in pressure chamber 26 causes displacement of stepped piston 7 simultaneously with the closure of fluid passageway 12 whereby the volume of fluid inlet chamber 10 is reduced and the volume of fluid outlet chamber 11 is increased. Then an additional pressure increase occurs in front wheel brake VA1 because of the reduced volume in chamber 10, and a pressure reduction occurs in rear-wheel brake HA because of the enlarged volume in chamber 11. From this results the course of the characteristic of FIG. 2 from D to E.

Now the case will be described in which first band master cylinder $H_{Hz}$ and then pedal master cylinder $F_{Hz}$ are actuated. At the beginning of the braking action, the brake force regulator is in the inactivated position shown in FIG. 1. On actuation of hand master cylinder $H_{Hz}$ wheel brake VA2. Therefore, the motorcycle is initially braked at its front wheel only. This is shown by the course of the dash line between points O and H.

H is assumed to be the point at which the vehicle operator actuates pedal master cylinder $F_{Hz}$ additionally. The pedal master cylinder causes a pressure to be developed in fluid inlet chamber 10 which moves step piston 7 slightly to the left in the drawing to displace piston 7 from its stop on screw 4. The pressure fluid then propagates to front-wheel brake VA1, on the one hand, and through open fluid passageway 12 into fluid outlet chamber 11 and onwards to rear-wheel brake HA on the other hand. Because of the different areas subjected to pressure, namely, the area $d_1$ and the area $(d_1-d_2)$, a differential of force will act on valve-closure member 17 moving piston 18 against spring 22. Ring seal 20 thereby moves into seating engagement with valve seat 21, thus closing fluid passageway 12. This is at point A′ of FIG. 2.

With the pressure in fluid inlet chamber 10 continuing to increase, the pressure of the rear-wheel brake remains constant until the action of the force generated by hand master cylinder $H_{Hz}$ upon pressure piston 24 is balanced. This point is identified by A″ in FIG. 2.

With the pressure in fluid inlet chamber 10 increasing by continued actuation of pedal master cylinder $F_{Hz}$, stepped piston 7 and pressure piston 24, the two parts of the control piston, are displaced against return spring 27. Piston 18 follows this movement due to the pressure in chamber 10 keeping passageway 12 closed. As a result of the displacement of pressure piston 24, the volume of pressure chamber 26 is reduced whereby the pressure prevailing therein is increased. The displacement of stepped piston 7 causes at the same time a pressure increase in fluid outlet chamber 11 as compared to the pressure prevailing in fluid inlet chamber 10. If, during actuation of pedal master cylinder $F_{Hz}$, hand master cylinder $H_{Hz}$ is left in its position attained at point A″, there results, after closing of the valve in passageway 12 a pressure buildup in the front and rear-wheel brakes which corresponds to the course of the characteristic of FIG. 2 between points A″ and B′. The pressure increase in rear-wheel brake HA is continued until piston 18 abuts cross member 23 which prevents it from being displaced further. This is at point B′ of FIG. 2.

As a result of piston 18 bearing against cross member 23, the effective area of stepped piston 7 subjected to the pressure in fluid inlet chamber 10 is reduced from area $d_1$ to area $(d_3-d_1)$. The pressure in fluid inlet chamber 10 is increased until the forces acting on stepped piston 7 are equal. Then valve-closure member 17 is lifted off its valve seat and a pressure compensation occurs provided that the pressures prevailing in chambers 10 and 11 are different, i.e., both brakes HA and VA1 are subjected to equal brake pressures. The sum of the brake pressures at both front-wheel brakes VA1 and VA2 is greater than the brake pressure at rear-wheel brake HA. This point is identified by C′ in FIG. 2. With the actuation of pedal master cylinder $F_{Hz}$ continuing and the position of hand master cylinder $H_{Hz}$ being maintained unchanged, the pressures in front-wheel brake VA1 and in rear-wheel brake HA increase evenly. The brake pressure distribution then corresponds to the course of the characteristic of FIG. 2 continuing from point C′ at an angle of 45° toward point E′.

While we have described above the principles of our invention in connection with specific apparatus it is to be clearly understood that this description is made only by way of example and not as a limitation to the scope of our invention as set forth in the objects thereof and in the accompanying claims.

We claim:

1. A brake force regulator for a motorcycle brake system comprising:

a control piston disposed coaxially within a housing, said control piston being slidable in response to pressure from a hand master cylinder and adapted to reduce brake pressure to a rear-wheel brake upon movement of said control piston into a fluid input chamber disposed in said housing connected to a pedal master cylinder, said movement being caused by said pressure of said hand master cylinder which increases the volume of a fluid outlet chamber disposed in said housing connected to said rear-wheel brake;

a fluid passageway disposed in said control piston connecting said inlet chamber to said outlet chamber;

a second piston having a closure member for said passageway disposed within said control piston, said second piston being movable in a closing direction of said passageway against the force of a first spring extending into a hollow space in said housng connected to atmosphere;

a return spring abuting one end of said control piston to urge said control piston into abutment with a stop in said housing adjacent said inlet chamber, said control piston having an effective area adjacent said inlet chamber subjected to pressure against the force of said return spring to cause displacement of said control piston in the direction of said outlet chamber;

means disposed within said housing adjacent said control piston which, upon attainment of a predetermined differential of pressure between the pressures prevailing in said inlet and outlet chambers, open said passageway after it has been closed during a braking operation; and sealed areas of said control piston have their cross-sections dimensioned independently of each other.

2. A regulator according to claim 1, wherein said means includes a rectangular-like cross member secured to said housing to limit the displacement of said second piston relative to said housing.

3. A regulator according to claim 2, wherein
   said control piston includes two parts, and
   said hollow space is formed between said two piston parts.

4. A regulator according to claim 3, wherein
   one of said two piston parts is a stepped piston having an end surface of its larger diameter portion forming a boundary of said inlet chamber and an annular surface of its step forming a boundary of said outlet chamber.

5. A regulator according to claim 4, wherein
   the smaller diameter portion of said stepped piston is guided in a sleeve secured to said housing.

6. A regulator according to claim 4, wherein
   the other of said two piston parts is a pressure piston subjected to said pressure of said hand master cylinder and to the force of said return spring.

7. A regulator according to claim 6, wherein
   the smaller diameter portion of the said stepped piston is guided in a sleeve secured to said housing, and
   the diameter of pressure piston is greater than the diameter of the smaller diameter portion of said stepped piston.

8. A regulator according to claim 7, wherein
   said cross member is engaged between a step on the inner surface of said housing and said sleeve and extends through an opening in said stepped piston.

9. A regulator according to claim 5, wherein
   said cross member is engaged between a step on the inner surface of said housing and said sleeve and extends through an opening in said stepped piston.

10. A regulator according to claim 1, wherein
    said control piston includes two parts, and
    said hollow space is formed between said two piston parts.

11. A regulator according to claim 10, wherein
    one of said two piston parts is a stepped piston having an end surface of its larger diameter portion forming a boundary of said inlet chamber and an annular surface of its step forming a boundary of said outlet chamber.

12. A regulator according to claim 11, wherein
    the smaller diameter portion of said stepped piston is guided in a sleeve secured to said housing.

13. A regulator according to claim 11, wherein
    the other of said two piston parts is a pressure piston subjected to said pressure piston subjected to said pressure of said hand master cylinder and to the force of said return spring.

14. A regulator according to claim 13, wherein
    the smaller diameter portion of said stepped piston is guided in a sleeve secured to said housing, and
    the diameter of said pressure piston is greater than the diameter of the smaller diameter portion of said stepped piston.

15. A regulator according to claim 14, wherein
    said means is engaged between a step on the inner surface of said housing and said sleeve and extends through an opening in said stepped piston.

* * * * *